United States Patent
Bode et al.

(10) Patent No.: US 7,020,535 B1
(45) Date of Patent: Mar. 28, 2006

(54) METHOD AND APPARATUS FOR PROVIDING EXCITATION FOR A PROCESS CONTROLLER

(75) Inventors: Christopher A. Bode, Austin, TX (US); J. Broc Stirton, Austin, TX (US); Robert J. Chong, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 146 days.

(21) Appl. No.: 10/702,877

(22) Filed: Nov. 6, 2003

(51) Int. Cl.
*G06F 19/00* (2006.01)

(52) U.S. Cl. .................. 700/108; 700/110; 702/83

(58) Field of Classification Search ............... 700/108, 700/121, 31, 110, 109; 702/83, 84; 427/585
See application file for complete search history.

(56) References Cited

U.S. PATENT DOCUMENTS

| | | | |
|---|---|---|---|
| 6,587,744 B1 * | 7/2003 | Stoddard et al. | 700/121 |
| 6,594,589 B1 * | 7/2003 | Coss et al. | 702/34 |
| 6,687,561 B1 * | 2/2004 | Pasadyn et al. | 700/110 |
| 6,836,691 B1 * | 12/2004 | Stirton | 700/108 |
| 2003/0049390 A1 * | 3/2003 | Shanmugasundram et al. | 427/585 |

* cited by examiner

*Primary Examiner*—Leo Picard
*Assistant Examiner*—Steven R. Garland
(74) *Attorney, Agent, or Firm*—Williams, Morgan & Amerson

(57) ABSTRACT

A method includes defining a design window for a manufacturing process performed by a tool and a process window within the design window. A workpiece likely to have a characteristic outside the process window is identified. The characteristic of the identified workpiece is measured. A control model for controlling the tool is updated using the measured characteristic. A system includes a tool, a process controller, a metrology tool, and a sampling controller. The tool is adapted to process workpieces in accordance with a manufacturing process. The manufacturing process has an associated design window and a process window defined within the design window. The process controller is adapted to control the tool using a control model. The sampling controller is adapted to identify a workpiece likely to have a characteristic outside the process window and direct the metrology tool to measure the characteristic of the identified workpiece. The process controller is further adapted to update the control model using the measured characteristic.

30 Claims, 5 Drawing Sheets

METHOD AND APPARATUS FOR PROVIDING EXCITATION FOR A PROCESS CONTROLLER

BACKGROUND OF THE INVENTION

1. Field of the Invention

This invention relates generally to the field of industrial processing, and, more particularly, to a method and apparatus for providing excitation for a process controller.

2. Description of the Related Art

There is a constant drive within industries, such as the semiconductor industry, to increase the quality, reliability and throughput of manufactured workpieces (e.g., integrated circuit devices, microprocessors, memory devices, and the like). In the semiconductor industry, this drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, rapid thermal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, precision, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data provided by metrology tools, integrated metrology, or in-situ sensors is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Typically, a control model is used to generate control actions for changing the operating recipe settings for a process tool being controlled based on feedback or feedforward metrology data related to the processing by the process tool. A control model typically includes one or more configurable controller tuning parameters. Exemplary tuning parameters include gain factors that are applied to feedback or feedforward metrology data or weight factors that are applied to current and historical metrology data for data smoothing techniques. Values for the tuning parameters may be calculated or determined empirically.

Certain types of control models estimate various states of the processes being controlled and employ the state estimates for generating control actions. The efficacy of the process controller depends in great part on the effectiveness at which the states can be estimated and updated. Adaptive control techniques are one such class of control schemes where the controller automatically adjusts its model parameters and tuning to account for observed changes in the process itself. These techniques often rely on online model parameter estimation, and the controller settings are continually adjusted to match the current system model derived from the measurements. Adaptive control is useful when the true model of the system is unknown or complicated, since the control law can be based on a simpler model with adjustable parameters. These controllers can be obtained from a variety of design methods including pole placement techniques, minimization of quadratic cost functions, or solving of a Lyapanov function. Adaptive control techniques can enable advanced control concepts such as optimal control, robust control, adaptive control, or robust adaptive control to be used in cases where the system under study is totally unknown, poorly understood, or complicated.

FIG. 1 is a graph showing parameters X and Y for a process under control. For example parameter X may represent an input parameter for the process and parameter Y may represent an output parameter for the process. A process or parameter design window 2 is defined for the process. For example, a design of experiments process may be used to map extremes of the process by running the process at various input settings and obtaining output parameters (e.g., yield or electrical parameters). Typically once the results (e.g., yield or electrical parameters) are analyzed, the process is constrained to a process window 4 to avoid the edges of the design window 2. Due to the constraint and subsequent process control, metrology data 6 collected for the process under control typically lies in the process window 4.

To effectively estimate model parameters in an online fashion, some process characteristics are required. Identification of a process under automatic control is complicated because the actions of the controller mask the underlying behavior of the process. In general, the inputs to the process have to vary in such a way that the model parameters can be uniquely identified. This requirement is called persistent excitation. A difficulty arises because the satisfaction of a typical control objective lowers the amount of excitation as the process reaches a steady state at the desired operating point. At steady state, there is less variation observed in the input and output parameters (i.e., the metrology data 6 is within the process window 4). This situation may reduce the efficacy of the process controller by reducing its ability to estimate various state parameters used in its control model. This situation naturally gives rise to a tighter operating window.

One technique used to provide persistent excitation is to inject small perturbations into the manipulated variables so that the dynamics become visible at the cost of small fluctuations around the process targets. One limitation of this technique is that it is not straightforward to apply standard persistent excitation techniques to many of the process systems and models that are prevalent in a batch processing environment. In many cases, the state variable to be estimated is not directly affected by the commonly chosen input variables. A common example is a timed process, where the state to be estimated is a rate and the processing time is manipulated. Due to reactor fouling or consumable degradation, the chosen processing time can indeed have an effect on the processing rate for future runs. However, the time would have to be adjusted well outside the standard operating range for the rate differences to become noticeable.

A further limitation of a persistent excitation technique is that it injects noise into the processing environment to ensure adequate excitation of the observed parameters. This noise tends to reduce the quality of the workpieces manufactured because features are intentionally formed having characteristics that vary from the established target values. For many processes, a high importance is placed on every batch reaching its targets. In such cases, the noise introduced through the persistent excitation process is undesirable.

The present invention is directed to overcoming, or at least reducing the effects of, one or more of the problems set forth above.

SUMMARY OF THE INVENTION

One aspect of the present invention is seen in a method that includes defining a design window for a manufacturing process performed by a tool and a process window within the design window. A workpiece likely to have a characteristic outside the process window is identified. The characteristic of the identified workpiece is measured. A control model for controlling the tool is updated using the measured characteristic.

Another aspect of the present invention is seen in a system including a tool, a process controller, a metrology tool, and a sampling controller. The tool is adapted to process workpieces in accordance with a manufacturing process. The manufacturing process has an associated design window and a process window defined within the design window. The process controller is adapted to control the tool using a control model. The sampling controller is adapted to identify a workpiece likely to have a characteristic outside the process window and direct the metrology tool to measure the characteristic of the identified workpiece. The process controller is further adapted to update the control model using the measured characteristic.

BRIEF DESCRIPTION OF THE DRAWINGS

The invention may be understood by reference to the following description taken in conjunction with the accompanying drawings, in which like reference numerals identify like elements, and in which.

Figure 1:
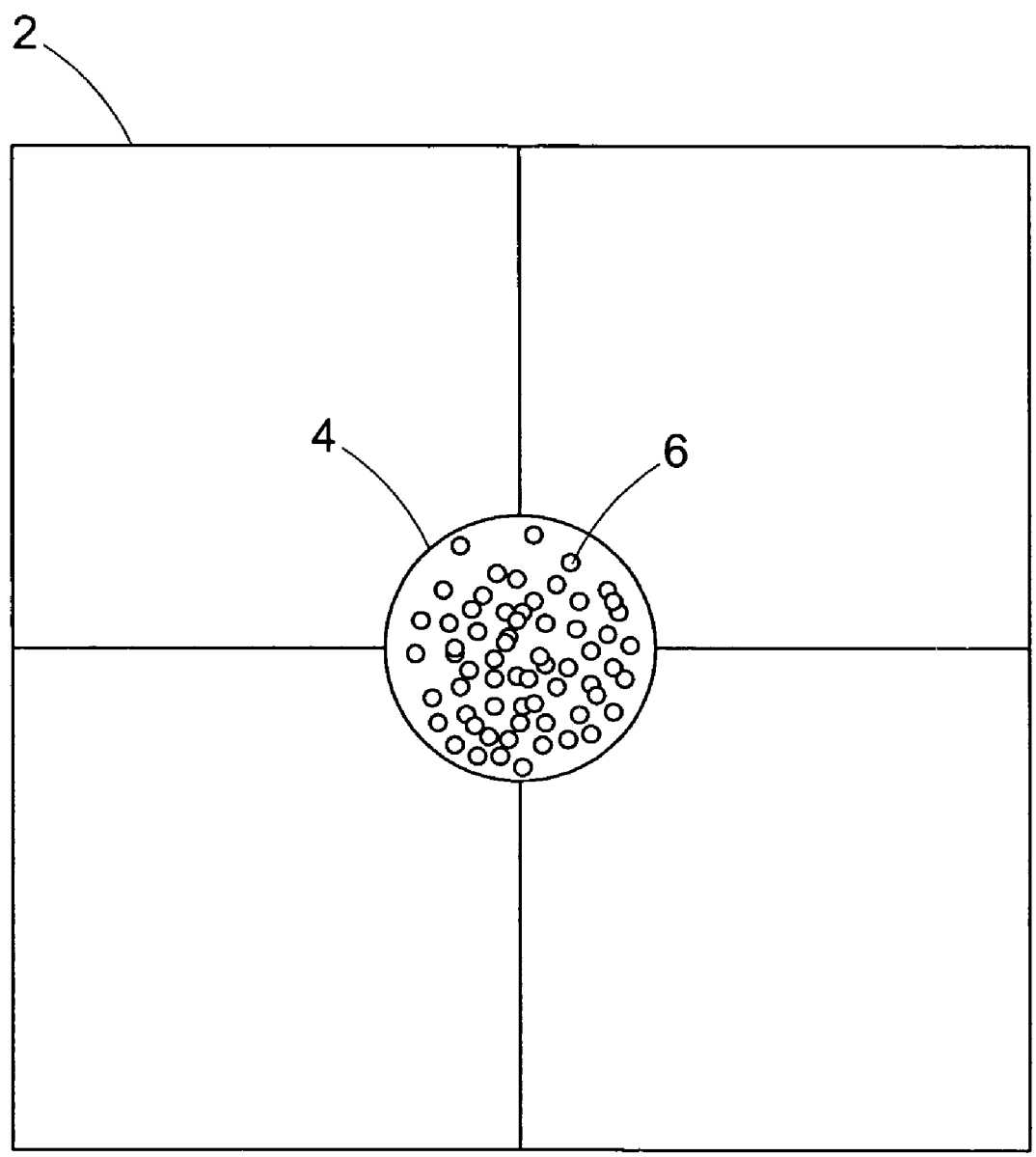
FIG. 1 is a graph of parameters for a process under control.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
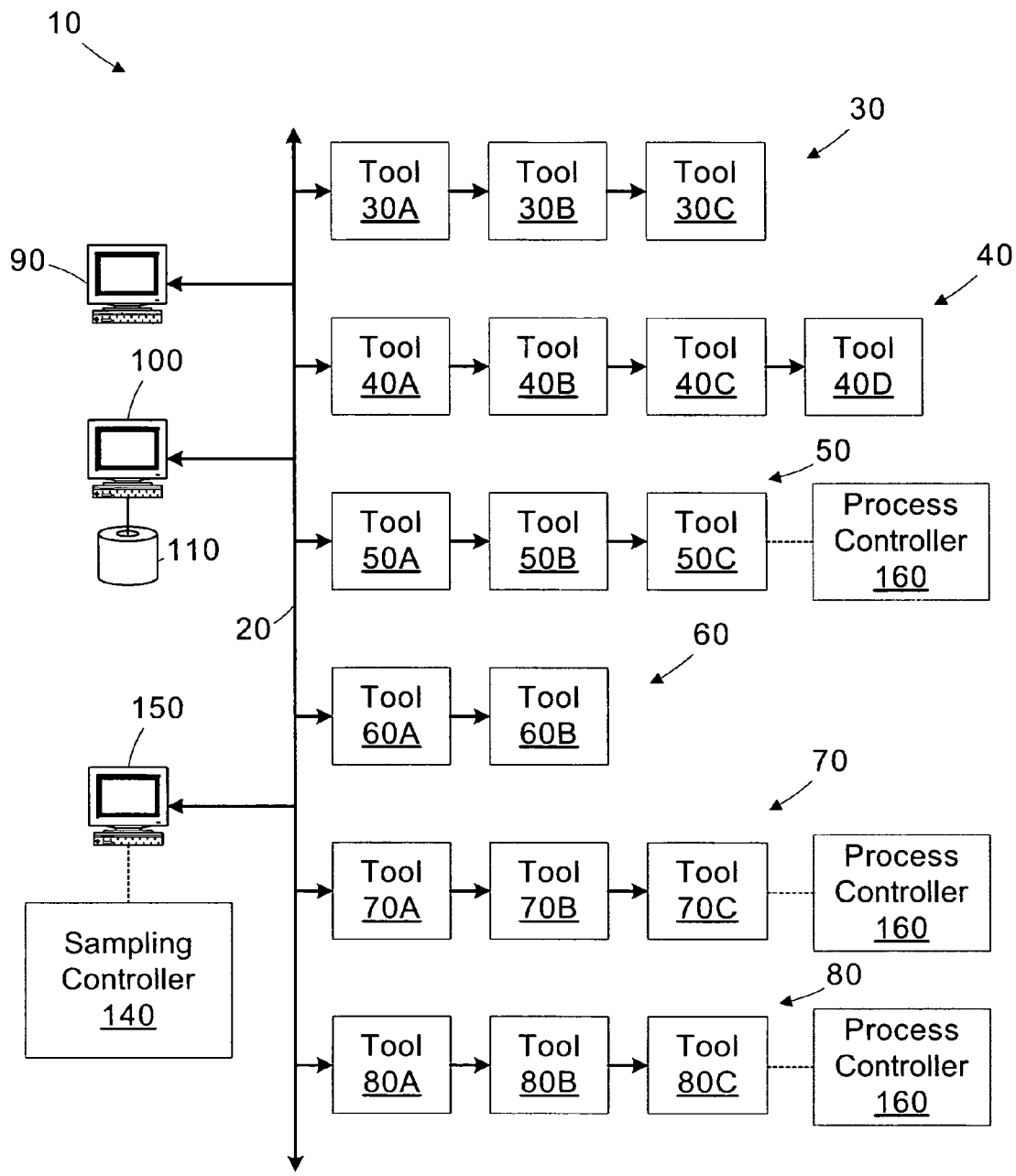
FIG. 2 is a simplified block diagram of a manufacturing system in accordance with one illustrative embodiment of the present invention.

Referring to FIG. 2, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server 90 directs high level operation of the manufacturing system 10. A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process, in-situ sensor, integrated metrology, or post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a sampling controller 140 executing on a workstation 150. The sampling controller 140 selects wafers for which metrology data is to be collected to update the control state information for one or more of the process controllers 160 associated with individual tools 30–80. The process controllers 160 determine control actions for controlling selected ones of the tools 30–80 serving as process tools based on the metrology data collected during the fabrication of wafers (i.e., by others of the tools 30–80 serving as metrology tools). The particular control models used by the process controllers 160 depend on the type of tool 30–80 being controlled. The control models may be developed empirically using commonly known linear or non-linear techniques. The control models may be relatively simple equation-based models (e.g. linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

In general, the sampling controller 140 attempts to identify wafers that are outside the process window 4 (see FIG. 1) to provide excitation for the process controllers 160 during the control of the tools 30–80. The sampling controller 140 may first select wafers to be measured based on a predetermined sampling plan. As discussed above, many of these wafers will have characteristics that fall within the process window 4 due to steady state conditions and process control. The sampling controller 140 may then add wafers it has identified as being outside the process window 4 or having an increased potential for being outside the process window to provide increased excitation data. Subsequently, metrology data is collected for the selected wafers (i.e., the wafers selected under the sampling plan and/or the wafers targeted as having an increased likelihood of being outside the process window 4). Although the sampling unit described above is a wafer, the sampling techniques may apply to different granularity levels, and the application of the present invention is not limited to any particular sampling unit. For example, the sampling controller 140 may target lots of wafers, individual wafers (i.e., as in the example above), dice on a wafer, packaged die, or structures on a die.

It is useful to note that the sampling controller 140 does not generally attempt to identify faulty wafers, as metrology data collected therefrom may not be useful for process control, but rather to identify acceptable wafers that have increased variation as compared to typical wafers within the process window 4. Faulty wafers may be identified by other fault detection and classification (FDC) systems (not shown) monitoring the manufacturing system 100.

Figure 3:
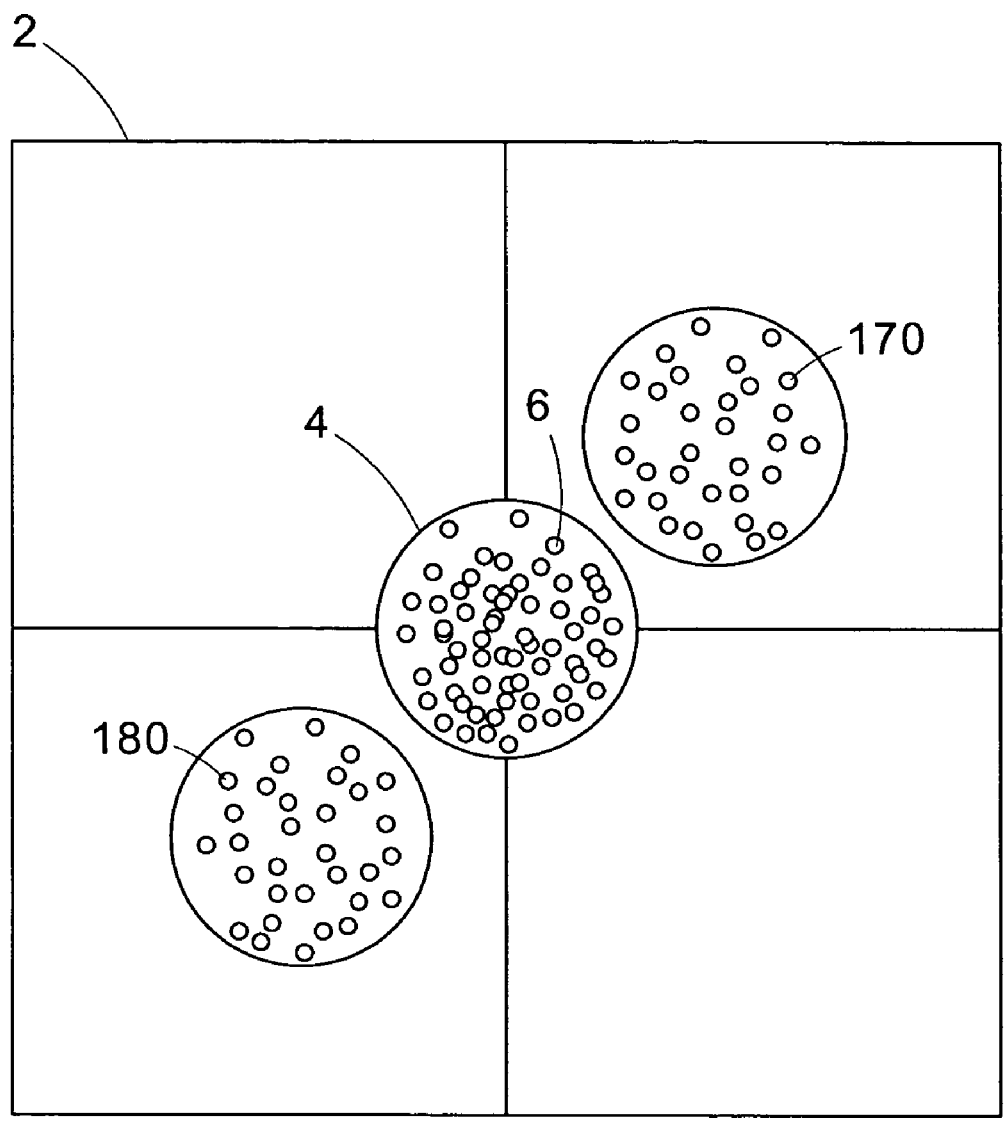
FIG. 3 is a graph of parameters for a process under control in accordance with the present invention.

FIG. 3 is a graph of a process where wafers with increased potential for variation are targeted by the sampling controller 140. Note that metrology data 170, 180 is collected outside the process window 4. Such data increases the process excitation seen by the process controller 160, dynamically increasing its current processing window and thereby increasing its ability to effectively update and operate its control model.

There are various techniques the sampling controller 140 may employ for targeting wafers likely to be outside the process window 4. In general, the sampling controller 140 receives indirect information related to a characteristic of the wafer. The sampling controller 140 is not able to determine an actual value of the characteristic based on the indirect data, but rather, the sampling controller 140 can determine that based on the indirect data, the probability that the characteristic is outside the process window 4 is greater as compared to a wafer without the situation indicated by the indirect data. The likelihood or probability measure need not be a precise quantitative threshold or comparison to other wafers, but rather, merely a qualitative indication that the characteristic may be outside the process window 4. Examples of indirect data include, but are not limited to, tool data associated with the processing of the wafer, data associated with a characteristic of the wafer different from the characteristic of interest, and lower precision or fault data associated with the characteristic. The sampling controller 140 may compare the indirect data to a predetermined range (e.g., ID>T1, ID<T2, T1<ID<T2, where ID is the indirect data and T1 and T2 are thresholds) of expected values and target wafers for metrology based on the indirect data being outside the predetermined range.

In a first embodiment, the sampling controller 140 identifies wafers that are likely to be outside the process window 4 based on tool information collected for the tool 30–80 used to process the wafer. The conformance of a tool 30–80 to expected performance standards may be monitored. Often a tool health metric is determined for a tool 30–80 providing a qualitative measure of how well the observed parameters for the tool 30–80 match those predicted by a model of the tool 30–80. One technique for monitoring the health of a particular tool 30–80 involves employing a multivariate tool health model adapted to predict the expected operating parameters of the tool during the processing of wafers in the tool. If the actual tool parameters are close to the predicted tool parameters, the tool is said to have a high health metric (i.e., the tool is operating as expected). As the gap between the expected tool parameters and the actual tool parameters widens, the tool health metric decreases. A tool 30–80 with a relatively high health metric is likely to be effectively controlled by a process controller 160 such that the wafers fabricated by the tool 30–80 are more likely to be within the process window 4. On the other hand, tools 30–80 with relatively lower tool health metrics are more likely to evidence higher levels of variation. Hence, the sampling controller 140 may identify wafers likely to be outside the process window 4 based on the tool health metrics. Wafers processed in such tools 30–80 may be targeted by the sampling controller 140 to provide excitation in the collected metrology data.

Typically, the tool health model used to predict the operating parameters of the tool 30–80, thereby measuring the health of the tool 30–80, is based on the particular tool 30–80 and the base operating recipe employed by the tool 30–80 for processing the wafers. Hence, each tool 30–80 may have a separate tool health model for each of the base operating recipes run on the tool 30–80. An exemplary tool health monitor software application is ModelWare™ offered by Triant, Inc. of Nanaimo, British Columbia, Canada Vancouver, Canada. An exemplary system for monitoring tool health is described in U.S. Pat. No. 6,594,589, entitled "METHOD AND APPARATUS FOR MONITORING TOOL HEALTH," filed in the names of Elfido Coss Jr., Richard J. Markle, and Patrick M. Cowan, that is assigned to the assignee of the present application and incorporated herein by reference in its entirety.

As an alternative to using a tool health metric, the sampling controller 140 may also monitor one or more individual parameters for a tool 30–80 to identify target wafers. For example, the sampling controller 140 may monitor a tool parameter, such as chamber pressure or temperature, and target a wafer responsive to the monitored parameter being outside a predetermined range or threshold.

In another embodiment, the sampling controller 140 may monitor wafers processed by the tools 30–80 to identify a particular tool 38–80 likely to process wafers having characteristics outside the process window 4. For example, for wafers selected for metrology that are determined to have characteristics outside the process window 4, the sampling controller 140 may look for commonalities in the processing histories of the wafers to determine if they have been processed in the same tools 30–80. In another variation of this embodiment, a tool operator may provide the sampling controller 140 with manual information regarding tools 30–80 likely to process wafers having characteristics outside the process window 4. The sampling controller 140 may then target wafers processed by the identified tools 30–80 to increase excitation in the metrology data provided to the process controllers 160.

Figure 4A:
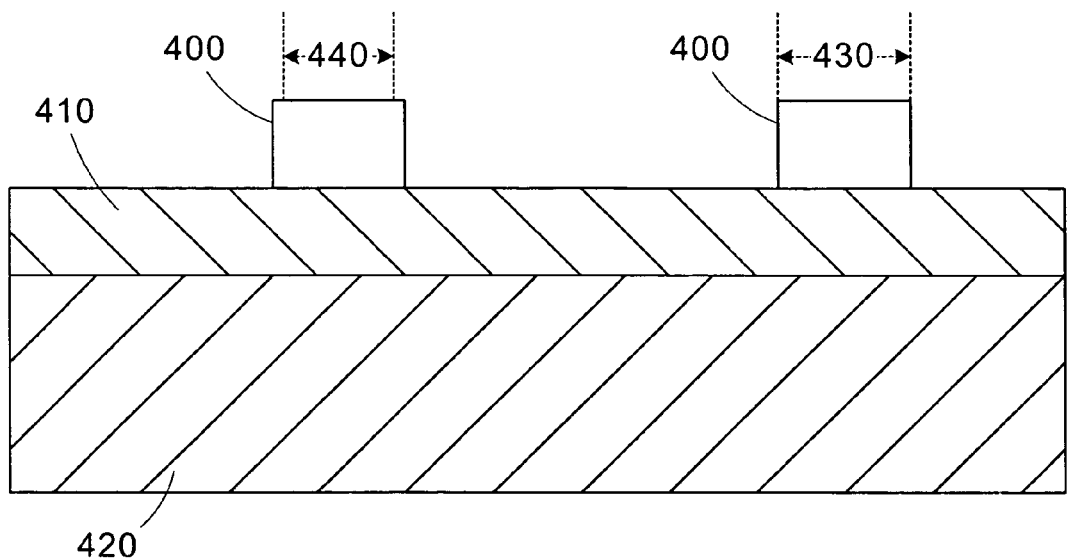
FIGS. 4A and 4B are cross section views of a semiconductor device manufactured by the system of FIG. 2.
Figure 4B:
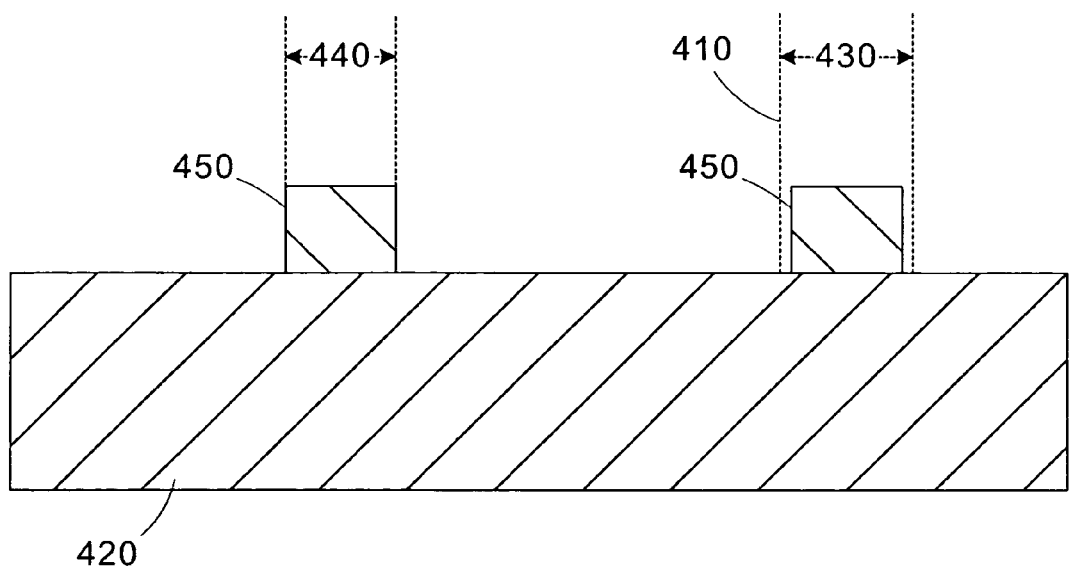

In yet another embodiment described in reference to FIGS. 4A and 4B, the sampling controller 140 may interact with the process controllers 160 and their associated tools 30–80 to force a wafer to have characteristics outside the process window 4 and then compensate for the deviation induced at a later processing step. FIG. 4A illustrates a photoresist line 400 formed over a process layer 410 (e.g., polysilicon) which has been formed over a base layer 420 (e.g., substrate). The sampling controller 140 may interface with a photolithography stepper or track (e.g., one of the tools 30–80) to change a photolithography parameter (e.g., exposure dose, focus, partial coherence, numerical aperture, post bake time or temperature) to cause a critical dimension (CD) 430 of the photoresist line 400 to be greater than a normal target CD 440 for the line 400 (see FIG. 4A). The CD 430 of the photoresist line 400 may then be measured and provided to a process controller 160 associated with the photolithography tool thereby increasing excitation seen by the process controller 160. In a subsequent processing step, the sampling controller 140 may interface with an etch tool (e.g., one of the tools 30–80) used to etch the process layer 410 underlying the pattern formed by the photoresist line 400 to generate a line 450 in the process layer 430 (see FIG. 4B) to change an etch parameter (e.g., trim etch time, etch time, plasma power, etc.) of the etch tool to compensate for the increase in the incoming CD 430 of the photoresist line 410. Due to this compensation, the final CD of the line 450 will be closer to the target CD 440. Metrology data collected after the etching of the line 450 may then be provided to the process controller 160 associated with the etch tool. Because the etch parameters differ from the steady state operating recipe parameters (i.e., due to the compensation), this metrology data will also have increased excitation. By changing one characteristic in a first process step and compensating for the change in a subsequent process step, excitation for both process steps may be increased without sacrificing quality of the device processed, because the final characteristics of the processed wafer are similar to those of other wafers processed without such manipulation and compensation.

In another embodiment of the present invention, the sampling controller 140 receives metrology data associated with the wafer and determines based on the metrology data that the wafer is likely to be outside the process window 4. For example, the initial metrology data may be a low precision measurement (e.g., fault measurement) of a particular characteristic. The precision of the measurement may be sufficient to identify a fault condition, but insufficient to update the control model of the process controller 160. The metrology data may suggest that the wafer is under the fault detection threshold, but may yet be outside the process window 4. In an alternative embodiment, the sampling controller 140 may receive metrology data related to one characteristic that indicates that another characteristic may be outside the process window 4. For example, reflectivity of a metal film being too high indicates that either temperature of gas flows may be incorrect.

Figure 5:
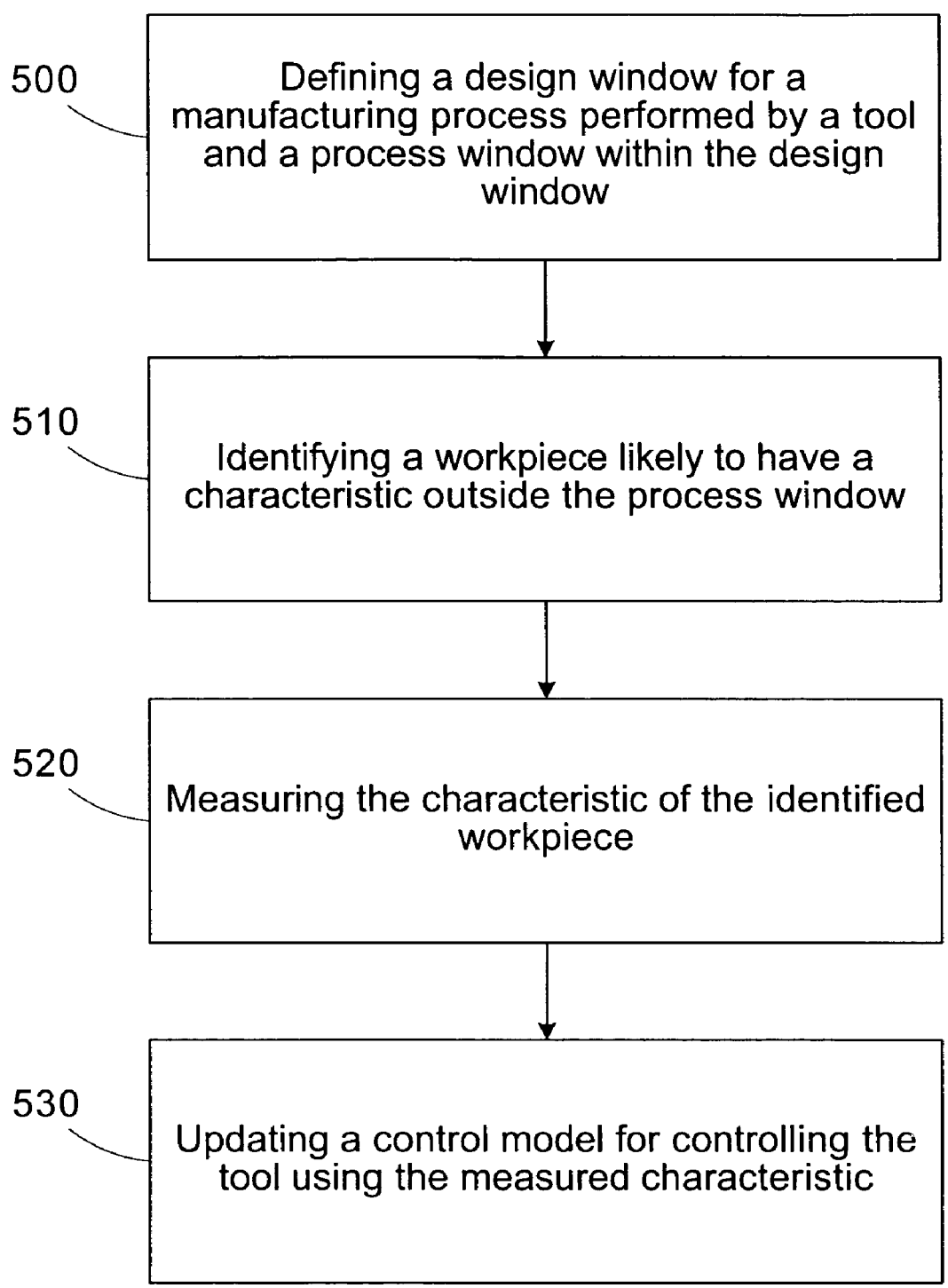
FIG. 5 is a simplified flow diagram of a method for providing excitation for a process controller in accordance with another implementation of the present invention.

Turning now to FIG. 5, a simplified flow diagram of a process for providing excitation for a process controller in accordance with another implementation of the present invention is provided. In block 500, a design window for a manufacturing process performed by a tool and a process window within the design window are defined. In block 510, a workpiece likely to have a characteristic outside the process window is identified. In block 520, the characteristic of the identified workpiece is measured. In block 530, a control model for controlling the tool is updated using the measured characteristic.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method, comprising:
    defining a design window for a manufacturing process performed by a tool and a process window within the design window;
    identifying a workpiece likely to have a characteristic outside the process window;
    measuring the characteristic of the identified workpiece;
    updating a control model for controlling the tool using the measured characteristic; and
    generating a control action for determining at least one parameter of an operating recipe for the tool based on the updated control model.

2. The method of claim 1, further comprising processing a plurality of workpieces in the tool based on the operating recipe generated from the control action.

3. The method of claim 1, wherein identifying the workpiece further comprises:
    receiving tool data associated with the processing of workpieces in a tool; and
    identifying the workpiece based on the tool data.

4. The method of claim 3, wherein receiving the tool data further comprises receiving a tool health metric for the tool.

5. The method of claim 1, wherein identifying the workpiece further comprises:
    receiving operator input identifying a particular tool; and
    identifying workpieces processed by the particular tool.

6. The method of claim 1, wherein identifying the workpiece further comprises:
    receiving a first measurement related to the characteristic;
    identifying the workpiece based on the first measurement;
    generating a second measurement of the characteristic, the second measurement having a higher precision than the first measurement; and
    updating the control model using the second measurement.

7. The method of claim 1, wherein identifying the workpiece further comprises:
    receiving a fault measurement related to the characteristic;
    identifying the workpiece based on the fault measurement;
    generating a metrology measurement of the characteristic; and
    updating the control model using the metrology measurement.

8. The method of claim 1, further comprising:
    modifying a first operating recipe of a first tool adapted to process a first workpiece in accordance with a first process to generate a first deviation in the characteristic;
    processing the first workpiece based on the modified first operating recipe;
    identifying the first workpiece as being likely to have the characteristic outside the process window;
    modifying a second operating recipe of a second tool adapted to process the first workpiece in accordance with a second process to compensate for the first deviation in the characteristic;
    processing the first workpiece based on the modified second operating recipe; and
    measuring the characteristic after at least one of the first and second processes are performed on the first workpiece.

9. The method of claim 1, wherein identifying the workpiece further comprises:
    receiving indirect data associated with the characteristic; and
    identifying the workpiece as being likely to have the characteristic outside the process window based on the indirect data being outside a predetermined range of expected values.

10. The method of claim 9, wherein receiving the indirect data further comprises receiving at least one of tool data associated with the processing of the workpiece, data associated with a different characteristic of the workpiece, low precision data associated with the characteristic, and fault data associated with the characteristic.

11. A method, comprising:
    processing a workpiece in a tool;

receiving indirect data associated with a characteristic of the workpiece;

selecting the workpiece based on the indirect data being outside a predetermined range of expected values;

measuring the characteristic of the selected workpiece;

updating a control model for controlling the tool using the measured characteristic; and generating a control action for determining at least one parameter of an operating recipe for the tool based on the updated control model.

12. The method of claim 11, further comprising processing a plurality of workpieces in the tool based on the operating recipe generated from the control action.

13. The method of claim 11, wherein receiving the indirect data further comprises receiving at least one of tool data associated with the processing of the workpiece, data associated with a different characteristic of the workpiece, low precision data associated with the characteristic, and fault data associated with the characteristic.

14. A system, comprising:
a tool for processing workpieces in accordance with a manufacturing process, the manufacturing process having an associated design window and a process window defined within the design window;
a process controller adapted to control the tool using a control model;
a metrology tool; and
a sampling controller adapted to identify a workpiece likely to have a characteristic outside the process window, and direct the metrology tool to measure the characteristic of the identified workpiece, wherein the process controller is further adapted to update the control model using the measured characteristic.

15. The system of claim 14, wherein the process controller is further adapted to generate a control action for determining at least one parameter of an operating recipe for the tool based on the updated control model.

16. The system of claim 15, wherein the tool is further adapted to process a plurality of workpieces based on the operating recipe generated from the control action.

17. The system of claim 14, wherein the sampling controller is further adapted to identify the workpiece by receiving tool data associated with the processing of workpieces in a tool and identifying the workpiece based on the tool data.

18. The system of claim 17, wherein the tool data further comprises a tool health metric associated with the tool.

19. The system of claim 14, wherein the sampling controller is further adapted to identify the workpiece by receiving operator input identifying a particular tool and identifying workpieces processed by the particular tool.

20. The system of claim 14, wherein the sampling controller is further adapted to identify the workpiece by receiving a first measurement related to the characteristic, identifying the workpiece based on the first measurement, and directing the metrology tool to generate a second measurement of the characteristic, the second measurement having a higher precision than the first measurement, wherein the process controller is further adapted to update the control model using the second measurement.

21. The system of claim 14, wherein the sampling controller is further adapted to identify the workpiece by receiving a fault measurement related to the characteristic, identifying the workpiece based on the fault measurement, and directing the metrology tool to generate a metrology measurement of the characteristic, wherein the process controller is further adapted to update the control model using the metrology measurement.

22. The system of claim 14, wherein the tool comprises a first tool having a first operating recipe and being adapted to process a first workpiece in accordance with a first process, the system further comprises a second tool having a second operating recipe and being adapted to process the first workpiece in accordance with a second process, the sampling controller is further adapted to modify the first operating recipe to generate a first deviation in the characteristic, the first tool is adapted to process the first workpiece based on the modified first operating recipe, the sampling controller is adapted to identify the first workpiece as being likely to have the characteristic outside the process window and modify the second operating recipe to compensate for the first deviation in the characteristic, the second tool is adapted to process the first workpiece based on the modified second operating recipe, and the metrology tool is adapted to measure the characteristic after at least one of the first and second processes are performed on the first workpiece.

23. The system of claim 14, wherein the sampling controller is further adapted to identify the workpiece by receiving indirect data associated with the characteristic and identifying the workpiece as being likely to have the characteristic outside the process window based on the indirect data being outside a predetermined range of expected values.

24. The system of claim 23, wherein the indirect data further comprises at least one of tool data associated with the processing of the workpiece, associated with a different characteristic of the workpiece, low precision data associated with the characteristic, and fault data associated with the characteristic.

25. A system, comprising:
a tool adapted to process a workpiece;
a process controller adapted to control the tool using a control model;
a metrology tool; and
a sampling controller adapted to receive indirect data associated with a characteristic of the workpiece, select the workpiece based on the indirect data being outside a predetermined range of expected values, and direct the metrology tool to measure the characteristic of the selected workpiece, wherein the process controller is further adapted to update the control model using the measured characteristic.

26. The system of claim 25, wherein the process controller is further adapted to generate a control action for determining at least one parameter of an operating recipe for the tool based on the updated control model.

27. The system of claim 26, wherein the tool is further adapted to process a plurality of workpieces based on the operating recipe generated from the control action.

28. The system of claim 25, wherein the indirect data further comprises receiving at least one of tool data associated with the processing of the workpiece, data associated with a different characteristic of the workpiece, low precision data associated with the characteristic, and fault data associated with the characteristic.

29. A system, comprising:
means for processing workpieces in accordance with a manufacturing process, the manufacturing process having an associated design window and a process window defined within the design window;
means for controlling the processing using a control model;

means for identifying a workpiece likely to have a characteristic outside the process window;
means for measuring the characteristic of the identified workpiece;
means for updating the control model using the measured characteristic; and
means for generating a control action for determining at least one parameter of an operating recipe for the means for processing workpieces based on the undated control model.

30. A system, comprising:
means for processing a workpiece;
means for receiving indirect data associated with a characteristic of the workpiece;
means for selecting the workpiece based on the indirect data being outside a predetermined range of expected values;
means for measuring the characteristic of the selected workpiece;
means for updating a control model for controlling the means for processing the workpiece using the measured characteristic; and
means for generating a control action for determining at least one parameter of an operating recipe for the means for processing a workpiece based on the updated control model.

* * * * *

UNITED STATES PATENT AND TRADEMARK OFFICE
CERTIFICATE OF CORRECTION

PATENT NO. : 7,020,535 B1 Page 1 of 1
DATED : March 28, 2006
INVENTOR(S) : Christopher A. Bode, J. Broc Stirton and Robert J. Chong It is certified that error appears in the above-identified patent and that said Letters Patent is hereby corrected as shown below:

<u>Column 13,</u>
Line 9, delete "undated," and insert -- updated --.

Signed and Sealed this

Sixteenth Day of May, 2006

JON W. DUDAS
*Director of the United States Patent and Trademark Office*